(12) United States Patent
Klingels

(10) Patent No.: US 11,965,462 B2
(45) Date of Patent: Apr. 23, 2024

(54) AIRCRAFT

(71) Applicant: MTU Aero Engines AG, Munich (DE)

(72) Inventor: Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/040,444

(22) PCT Filed: Aug. 2, 2021

(86) PCT No.: PCT/DE2021/100666
§ 371 (c)(1),
(2) Date: Feb. 3, 2023

(87) PCT Pub. No.: WO2022/028653
PCT Pub. Date: Feb. 10, 2022

(65) Prior Publication Data
US 2023/0286661 A1 Sep. 14, 2023

(30) Foreign Application Priority Data

Aug. 5, 2020 (DE) ..................... 10 2020 209 850.6

(51) Int. Cl.
*F02C 7/141* (2006.01)
*B64D 27/18* (2006.01)
(Continued)

(52) U.S. Cl.
CPC .............. *F02C 7/141* (2013.01); *B64D 27/18* (2013.01); *B64D 27/40* (2024.01); *B64D 29/06* (2013.01);
(Continued)

(58) Field of Classification Search
CPC .... F02C 7/141; F02C 7/20; F02C 7/32; F02C 3/305; F02C 1/002; F02C 6/16;
(Continued)

(56) References Cited

U.S. PATENT DOCUMENTS 7,971,438 B2    7/2011    Taylor et al.
8,291,716 B2    10/2012   Foster et al.
(Continued)

FOREIGN PATENT DOCUMENTS

DE    102012206123 A1 * 10/2013 ................ F02C 5/08
DE    102012206123 A1    10/2013
(Continued)

*Primary Examiner* — Kyle Robert Thomas
(74) *Attorney, Agent, or Firm* — Hinckley, Allen & Snyder, LLP; David R. Josephs

(57) ABSTRACT

The present invention relates to an aircraft comprising at least one wing, at least one flight propulsion drive, and a retainer, particularly an engine pylon, which interconnects the wing and the flight propulsion drive. The aircraft comprises at least one heat exchanger for cooling exhaust gas of the fight propulsion drive and/or at least one water removal channel having at least one removal apparatus for removing water from exhaust gas of the flight propulsion drive, especially after the exhaust gas has flowed through the heat exchanger. The removal apparatus is disposed on, more particularly in, the retainer or is connected to the wing by means of the retainer, and/or the flight propulsion drive is fastened to the retainer by means of at least one flight propulsion drive suspension means, and the heat exchanger is fastened, independently thereof, to the retainer by means of at least one heat exchanger suspension means.

11 Claims, 5 Drawing Sheets

(51) Int. Cl.
*B64D 27/40* (2024.01)
*B64D 29/06* (2006.01)
*B64D 33/10* (2006.01)
*F01N 3/02* (2006.01)
*F02C 3/30* (2006.01)
*F02C 7/16* (2006.01)
*F02C 7/18* (2006.01)

(52) U.S. Cl.
CPC ............ *B64D 33/10* (2013.01); *F01N 3/0205* (2013.01); *F02C 3/305* (2013.01); *F02C 7/16* (2013.01); *F02C 7/18* (2013.01); *F05D 2220/323* (2013.01); *F05D 2220/72* (2013.01); *F05D 2260/213* (2013.01); *F05D 2270/08* (2013.01)

(58) Field of Classification Search
CPC ......... F01K 23/10; B64D 27/18; B64D 27/40; B64D 29/06; B64D 33/10
See application file for complete search history.

(56) References Cited

U.S. PATENT DOCUMENTS

2013/0327059 A1    12/2013   Richardson
2017/0292412 A1*   10/2017   Fonseca ................ F01D 15/005

FOREIGN PATENT DOCUMENTS

| | | | |
|---|---|---|---|
| DE | 102018203159 A1 * | 9/2019 | ........... B01D 5/0027 |
| DE | 102018208026 A1 * | 11/2019 | ............. B64D 33/04 |
| DE | 102018208026 A1 | 11/2019 | |
| WO | 2019166040 A1 | 9/2019 | |
| WO | 2019223823 A1 | 11/2019 | |
| WO | 2020187345 A1 | 9/2020 | |

* cited by examiner

AIRCRAFT

BACKGROUND OF THE INVENTION

The present invention relates to an aircraft having at least one wing, at least one flight propulsion drive, and a retainer, especially an engine pylon, which joins together the wing or wings and the flight propulsion drive, as well as a method for operating, assembling, and/or servicing the aircraft.

From our own WO 2019/223823 A1 an aircraft propulsion system is known, having a turbofan engine connected downstream to an evaporator and a water recovery system.

SUMMARY OF THE INVENTION

An object to be achieved in one embodiment of the present invention is to improve an aircraft and/or its operation, assembly, and/or servicing.

This object is achieved by an aircraft of the present invention. A method for operating or assembling and/or servicing an aircraft of the present invention is discussed in detail below. Advantageous embodiments of the invention are also discussed below.

According to one embodiment of the present invention, an aircraft comprises at least one wing, preferably at least two (side) wings or airfoils arranged on opposite sides of the aircraft, and in one embodiment it is an airplane.

According to one embodiment of the present invention, the aircraft comprises at least one flight propulsion drive and one retainer, being in one embodiment an engine pylon, which joins together the at least one wing and the at least one flight propulsion drive, preferably one or more flight propulsion drives, on one or both wings (respectively), being respectively connected by a retainer, especially its own retainer, in one embodiment by an engine pylon (its own pylon), to the (respective) wing, in one embodiment a first retainer, which connects a first one of the flight propulsion drives to a wing and at least one further retainer, which connects another one of the flight propulsion drives to this or to another (of the) wing(s).

In one embodiment, the one or more flight propulsion drives (each) comprise at least one thermal engine, being in one embodiment a gas turbine, and/or at least one propeller, being in one embodiment enclosed and/or coupled by a gearing to this thermal engine. In one embodiment, the one or one of the several flight propulsion drive(s) (each) comprise a turbofan or turboprop flight propulsion drive or engine.

The present invention is especially suitable for this, on account of the great prevalence and the broad use spectrum of such flight propulsion drives, but it is not limited thereto.

According to one embodiment of the present invention, the aircraft comprises at least one heat exchanger, which at least temporarily cools down the exhaust gas of the at least one flight propulsion drive, especially its thermal engine, generating and/or superheating steam in this way in one embodiment, or being provided for this, in particular, adapted to or used for this; in one embodiment it comprises a first heat exchanger, which at least temporarily cools down the exhaust gas of the first flight propulsion drive, especially its thermal engine, and at least one further heat exchanger, which at least temporarily cools down the exhaust gas of the further flight propulsion drive, especially its thermal engine, or being provided for this purpose, in particular being adapted to or used for this.

In this way, in one embodiment, waste heat can be advantageously utilized, thereby improving the operation, especially the efficiency, of the aircraft.

According to one embodiment of the present invention, the at least one flight propulsion drive is mounted by one or more flight propulsion drive suspensions and the at least one heat exchanger (for cooling down the exhaust gas of this flight propulsion drive) is mounted, independently thereof, by one or more heat exchanger suspensions on the retainer (for this flight propulsion drive), while in one embodiment the first flight propulsion drive is mounted by one or more flight propulsion drive suspensions and the first heat exchanger is mounted, independently thereof, by one or more heat exchanger suspensions on the first retainer and the further flight propulsion drive is mounted by one or more flight propulsion drive suspensions and the further heat exchanger (for this flight propulsion drive) is mounted, independently thereof, by one or more heat exchanger suspensions on the further retainer.

In this way, in one embodiment, the flight propulsion drive and the heat exchanger can be handled independently of each other, in particular the flight propulsion drive can be removed from the retainer and the heat exchanger can remain on the retainer or vice versa. In this way, in one embodiment, assembling and/or servicing can be improved. In addition or alternatively, in this way in one embodiment a load distribution and/or load channeling can be improved and/or vibrations can be reduced, thereby improving the operation, especially the service life, of the aircraft.

In addition or alternatively to the aspect of the (independently mounted) heat exchanger, the aircraft according to one embodiment of the present invention comprises at least one water removal channel having at least one removal apparatus, which at least temporarily removes water, especially water of condensation, from the exhaust gas of the at least one flight propulsion drive, especially its thermal engine, occurring, in one embodiment, after flowing through the heat exchanger (for this flight propulsion drive), or being provided for this purpose, in particular being adapted to or used for this. In one embodiment, the aircraft comprises a first water removal channel having at least one removal apparatus, which at least temporarily removes water from the exhaust gas of the first flight propulsion drive, especially its thermal engine, occurring in one embodiment after flowing through the first heat exchanger, and at least one further water removal channel having at least one removal apparatus, which at least temporarily removes water from the exhaust gas of the further flight propulsion drive, especially its thermal engine, occurring in one embodiment after flowing through the further heat exchanger, or being provided for this purpose, in particular being adapted to or used for this.

In this way, in one embodiment, water can be removed from the exhaust gas and thus in particular the formation of a condensation trail can be reduced, thereby sparing the environment or improving the (environmentally friendly) operation of the aircraft. In addition or alternatively, in this way, in one embodiment, it is possible to recover water and use it in the operation of the aircraft, especially for a steam supply process to be explained below, thereby improving the operation, especially the efficiency, of the aircraft.

In one embodiment, the water separated in the at least one water removal channel is at least partly evaporated, in one embodiment superheated, at least temporarily in the at least one heat exchanger, and then, in one embodiment, it is supplied via a steam turbine, to be explained below, to at least one combustion space of the at least one flight propulsion drive, especially its thermal engine, or the aircraft is adapted for this purpose. In one embodiment, the water separated in the first water removal channel is at least partly evaporated, in one embodiment superheated, at least temporarily in the first heat exchanger, and then, in one embodiment, it is supplied via a (first) steam turbine, to be explained below, to at least one combustion space of the first flight propulsion drive, especially its thermal engine, and the water separated in the further water removal channel is at least partly evaporated, in one embodiment superheated, at least temporarily in the further heat exchanger, and then, in one embodiment, it is supplied via a (further) steam turbine, to be explained below, to at least one combustion space of the further flight propulsion drive, especially its thermal engine, or the aircraft is adapted for this purpose.

In this way, in one embodiment, waste heat can be especially advantageously utilized and the operation, especially the efficiency, of the aircraft can be especially greatly improved.

According to one embodiment of the present invention, the at least one removal apparatus is arranged in one embodiment in the retainer (for the at least one flight propulsion drive) or it is connected via, especially through or by means of, the retainer (for the at least one flight propulsion drive) to the wing, in one embodiment the at least one removal apparatus of the first water removal channel being arranged on, in particular in, the first retainer and connected via this first retainer to the (corresponding) wing, which connects the first flight propulsion drive to its wing, and the at least one removal apparatus of the further water removal channel is arranged on, in particular in, the further retainer and connected via this further retainer, which connects the further flight propulsion drive to its wing, to that wing or a corresponding wing.

In this way, in one embodiment, short distances can be realized between the flight propulsion drive and the removal apparatus, thereby reducing in particular the flow resistance and/or weight and thus improving the operation, especially the efficiency, of the aircraft. In addition or alternatively, in one embodiment, an especially advantageous weight distribution can be realized in this way, thereby improving the operation, especially the maneuverability, of the aircraft.

Insofar as we speak in the present document of "the flight propulsion drive", "the heat exchanger" or "the water removal channel" or "the removal apparatus", this shall involve, in one embodiment, "the at least one flight propulsion drive", "the at least one heat exchanger (for this at least one flight propulsion drive or for cooling down the exhaust gas of this at least one flight propulsion drives)", or "the at least one water removal channel (for this at least one flight propulsion drive or for separating the water from the exhaust gas of this at least one flight propulsion drive)" or "the at least one removal apparatus (of this at least one water removal channel)". In one embodiment, the corresponding remarks, especially the corresponding features, apply each time to the first flight propulsion drive or the first heat exchanger and/or the first water removal channel for this first flight propulsion drive or its removal apparatus and/or for the further flight propulsion drive or the further heat exchanger and/or the further water removal channel for this further flight propulsion drive or its removal apparatus.

In one embodiment, the aircraft comprises a steam supply device, which supplies steam to the at least one combustion space of the at least one flight propulsion drive, especially its thermal engine, at least temporarily, or which is provided for this purpose, in particular being adapted to or used for this.

As explained above, in one embodiment, the aircraft thus comprises a first steam supply device, which supplies steam to at least one combustion space of the first flight propulsion drive, especially its thermal engine, at least temporarily, and at least one further steam supply device, which supplies steam to at least one combustion space of the further flight propulsion drive, especially its thermal engine, at least temporarily, or the first and the further steam supply devices are provided for this, in particular being adapted to or used for this purpose. In the following, we shall no longer particularly point out the presence of a corresponding feature in the first and the further flight propulsion drive, retainer, heat exchanger or the first and the further water removal channel.

In this way, in one embodiment, the efficiency of the flight propulsion drive can be improved.

In one embodiment, this steam supply device is connected to the heat exchanger, which generates the steam at least temporarily.

In this way, in one embodiment, waste heat can be advantageously utilized, thereby improving the operation, especially the efficiency, of the aircraft.

In one embodiment, the aircraft comprises at least one steam turbine, arranged in one embodiment between the (first or further) heat exchanger and the (first or further) steam supply device, which feeds its useful power at least temporarily to a compressor or drives at least one compressor of the (first or further) flight propulsion drive, especially its thermal engine, or which is provided for this purpose, in particular being adapted to or used for this.

In this way, in one embodiment, waste heat can be advantageously utilized, thereby improving the operation, especially the efficiency, of the aircraft.

In one embodiment, the axis of rotation of the steam turbine and/or the axis of rotation of the compressor driven by it, especially a shaft coupling the steam turbine and the compressor, is spaced apart from the axis of rotation, especially the (principal) machine axis, of the flight propulsion drive, especially that of its thermal engine, in one embodiment at least that of one compressor stage and/or at least one turbine stage and/or the propeller, being in one embodiment offset parallel to this or slanting toward it, in one embodiment being askew.

In this way, in one embodiment, the coupling of steam turbine and compressor can be improved, in particular simplified in its design, as opposed to an arrangement concentric with the axis of rotation or the (principal) machine axis of the flight propulsion drive, and/or the compressor can be realized with larger rotating blades and thereby with better efficiency.

In one embodiment, the power of the steam turbine is mechanically coupled to the shaft of a high-pressure compressor or a high-pressure shaft.

In one embodiment, at least one gasket is arranged between the flight propulsion drive and the heat exchanger.

In this way, in one embodiment, the independent handling of the flight propulsion drive and the heat exchanger can be improved.

In one embodiment, the heat exchanger comprises one or more heat exchanger sections, arranged concentrically to an axis or the axis of rotation, especially the (principal) machine axis, of the flight propulsion drive and/or designed as tube-bundle and/or crossflow and/or counter-flow heat exchangers, especially as crossflow/counter-flow heat exchangers, being in one embodiment heat exchanger modules, while in one embodiment, two or more of the heat exchanger sections or modules have different diameters.

Thanks to the concentric arrangement and the design as tube-bundle and/or crossflow and/or counter-flow heat exchangers, the efficiency can be improved in one embodiment, and thanks to the design with multiple heat exchanger sections or modules, the assembly, servicing, and/or weight distribution can be improved in one embodiment.

In one embodiment, the aircraft comprises at least one condenser, which cools down, at least temporarily, the exhaust gas of the flight propulsion drive, especially that of its thermal engine, or is provided for this purpose, in particular is adapted to or used for this, and which is arranged between the heat exchanger and the water removal channel, being in one embodiment in a bypass duct of the flight propulsion drive.

In this way, in one embodiment, a water separation in the water removal channel can be improved.

In one embodiment, this condenser comprises one or more condenser sections, arranged concentrically to an axis or the axis of rotation, especially the (principal) machine axis, of the aircraft engine and/or designed as plate and/or crossflow and/or counter-flow heat exchangers.

In addition or alternatively, in one embodiment, the aircraft comprises at least one collection duct, in one embodiment enclosing the condenser, which collects, at least temporarily, the cooled exhaust gas, especially the exhaust gas cooled by the condenser, and carries it in one embodiment in the direction of the water removal channel, or is provided for this purpose, especially being adapted to or used for this.

In this way, in one embodiment a water separation in the water removal channel can be improved.

In one embodiment, the condenser is arranged in a bypass duct, especially a lateral flow duct, of the flight propulsion drive and/or has ambient air bathing it or flowing through it, which air is delivered by the propeller, or the aircraft is adapted for this purpose.

In this way, in one embodiment, the condensation can be improved and/or air can be heated in the bypass or lateral-flow duct and thereby the efficiency or thrust of the flight propulsion drive is improved.

In one embodiment, the removal apparatus comprises
at least one separation plate arranged in the water removal channel, being at least partly fluted or provided with grooves or channels in one embodiment;
at least one swirl generator, arranged in the water removal channel, in one embodiment being situated downstream from the separation plate, and in one embodiment being fixed in place;
at least one turbine stage, arranged in the water removal channel, being in one embodiment downstream from the separation plate, and being coupled to a generator in one embodiment;
at least one separation pipe, arranged in the water removal channel, in one embodiment downstream from the turbine stage and/or the swirl generator, being at least partly fluted or provided with grooves or channels in one embodiment;
at least one electrostatic removal apparatus; and/or
at least one heat exchanger through which a coolant circulating in a cooling circuit flows at least temporarily.

In addition or alternatively, in one embodiment, the removal apparatus, especially the separation plate, turbine stage, electrostatic removal apparatus, separation pipe and/or heat exchanger, comprises, at least for a portion, a hydrophilic surface.

In this way, in one embodiment, a water separation in the water removal channel can be improved.

In one embodiment, the aircraft comprises
at least one water tank, which stores water from the water removal channel, at least temporarily, or is designed to do so, in particular it is adapted for this purpose or used for this, and/or
at least one pump, which delivers water coming from the water removal channel, at least temporarily, in particular delivering water from the water removal channel to the water tank or from the water removal channel or the water tank to the heat exchanger, which in one embodiment evaporates it, at least temporarily and/or partially, or the pump and/or the heat exchanger are provided for this purpose, in particular, being adapted to or used for this, in one embodiment there being a first pump for delivering water from the water removal channel to the water tank and another pump for delivering water from the water tank to the heat exchanger.

In this way, in one embodiment, the separated water can be used in particular for a steam generation, especially for delivery to a combustion space of the flight propulsion drive, thereby improving the operation of the aircraft.

In one embodiment, the water tank and/or the pump is arranged on, especially in, the retainer or connected by it to the wing.

In one embodiment, the aircraft comprises at least one exhaust gas passage, which carries the exhaust gas of the flight propulsion drive from the heat exchanger and/or to the water removal channel or which is provided for this purpose, in particular adapted to or used for this, and which has at least one opening in a structural piece of the retainer, especially a pylon structural piece, being in one embodiment a wall, especially an inner wall, of the retainer, especially of the engine pylon, through which the exhaust gas flows at least temporarily, or which is provided for, especially adapted to or used for this.

In this way, in one embodiment, the exhaust gas channeling can be improved, in particular, the flow distance and/or resistance and/or the weight can be reduced, thereby improving the operation, especially the efficiency, of the aircraft.

In one embodiment, the flight propulsion drive is mounted removably in nondestructive manner on the retainer, being in one modification mounted across the at least one flight propulsion drive suspension, and being in one embodiment screwed to it by one or more screws.

In this way, in one embodiment, the assembly and/or the servicing can be improved.

In one embodiment, the at least one aircraft engine and/or its retainer, especially the engine pylon, (each) comprises a one-piece or multi-piece cladding, being in one embodiment at least partly removable and/or at least partly swivel-mounted, or a one-piece or multi-piece outer housing, being in one embodiment at least partly removable and/or at least partly swivel-mounted and/or arranged on the bottom side (the engine side) of the wing.

In this way, in one embodiment, the assembly and/or the servicing can be improved and/or the load distribution and/or load channeling and thus the operation of the aircraft can be improved.

In one embodiment, exhaust gas from the at least one aircraft engine is not transported in the wing on which it is mounted.

In this way, in one embodiment, the previous structure of the wing can be used without change or the aircraft engine can be combined with different wings.

In one embodiment, after flowing through the water removal channel underneath the wing, exhaust gas from the at least one aircraft engine is conveyed to the outside surroundings.

In this way, in one embodiment, a previous structure of the wing and/or a nacelle of the aircraft can be used without change.

In one embodiment, water is separated in the water removal channel, at least temporarily, at at least two sites spaced apart from each other, especially at at least two sites of the removal apparatus spaced apart from each other or by at least two removal apparatus spaced apart from each other, and/or separated water is taken in the water removal channel to at least one outlet, being in one embodiment on the wall side, especially the bottom side, or underneath, and being conveyed away, in one embodiment, through one or more grooves or channels, and/or to at least one or to the at least one outlet from the water removal channel. In one embodiment, the water removal channel, and in one further development, its at least one removal apparatus, comprises one or more grooves or channels, which collect water, at least temporarily, or are provided for this purpose, in particular being adapted to or used for this.

In this way, in one embodiment, a water separation in the water removal channel can be improved.

In one embodiment, the weight of the at least one aircraft engine is at least 100 kg, especially at least 500 kg, and/or the weight of the at least one heat exchanger is at least 1 kg, especially at least 5 kg, and/or the weight of the at least one removal apparatus is at least 1 kg, especially at least 5 kg. In one embodiment, the pump or at least one of the aforementioned pumps is an electric or electrically driven pump.

BRIEF DESCRIPTION OF THE DRAWING FIGURES

Further advantageous developments of the present invention will emerge from the dependent claims and the following description of preferred embodiments. For this purpose and partially diagrammatic:

DESCRIPTION OF THE INVENTION

Figure 1:
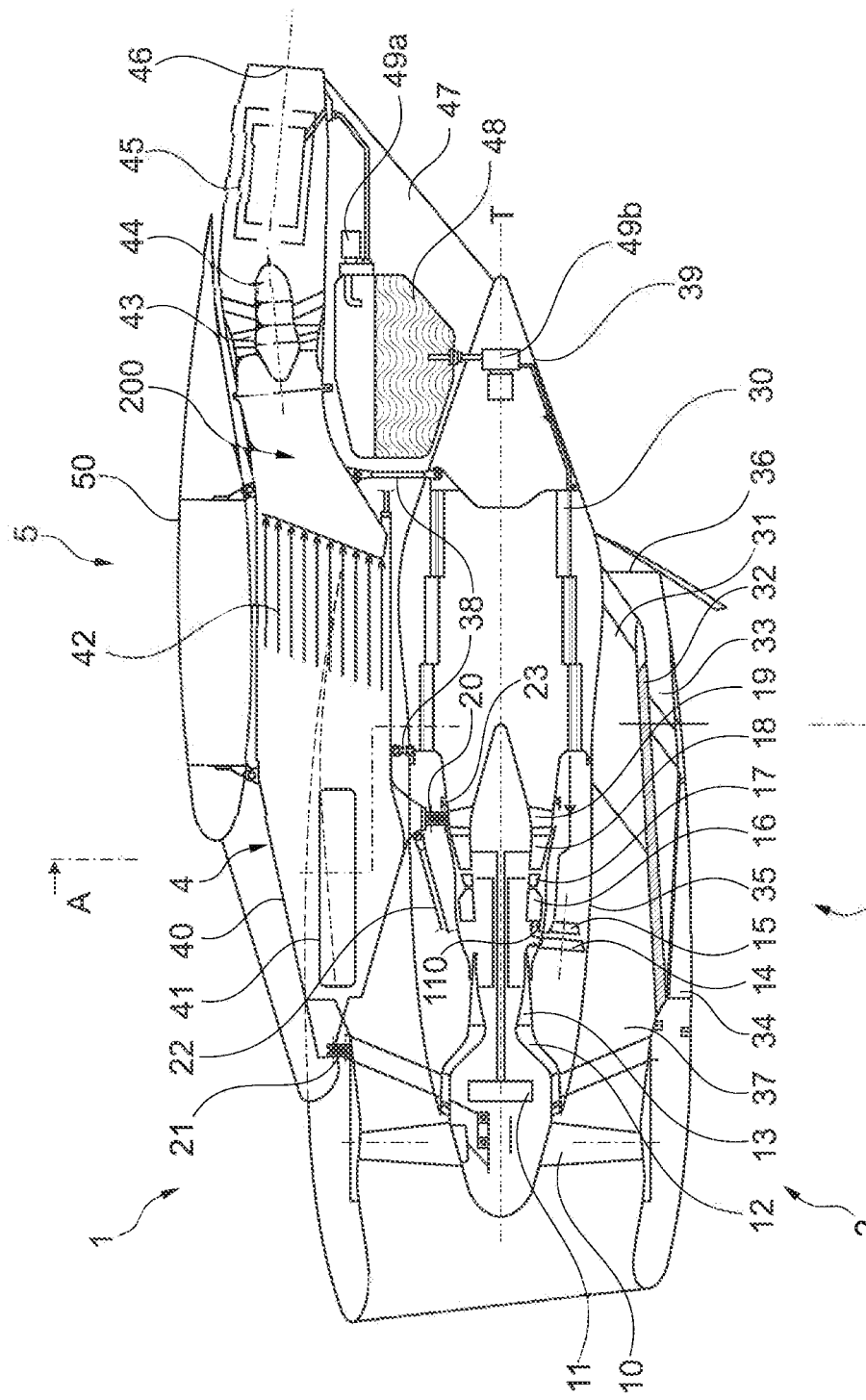
FIG. 1 shows part of an aircraft according to one embodiment of the present invention in a sectional view.
Figure 2:
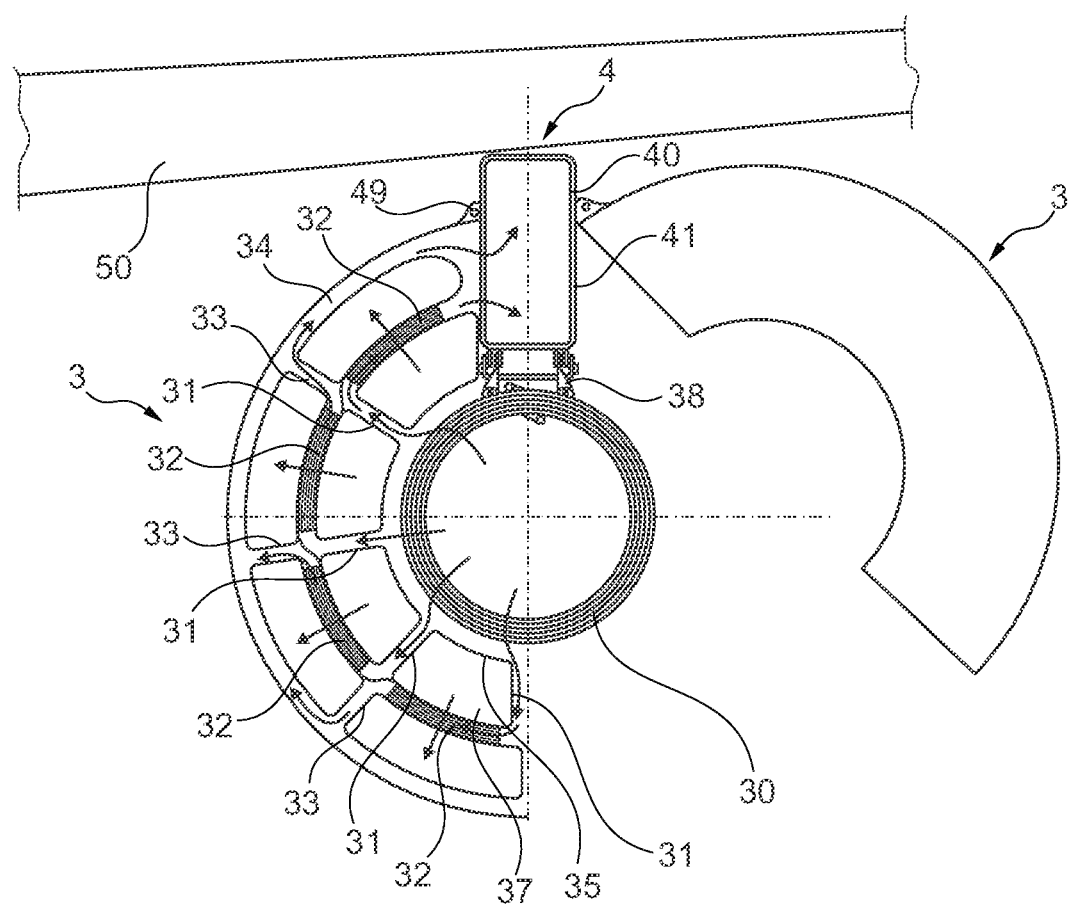
FIG. 2 shows the part in a sectional view along line A-A in FIG. 1.
Figure 3:
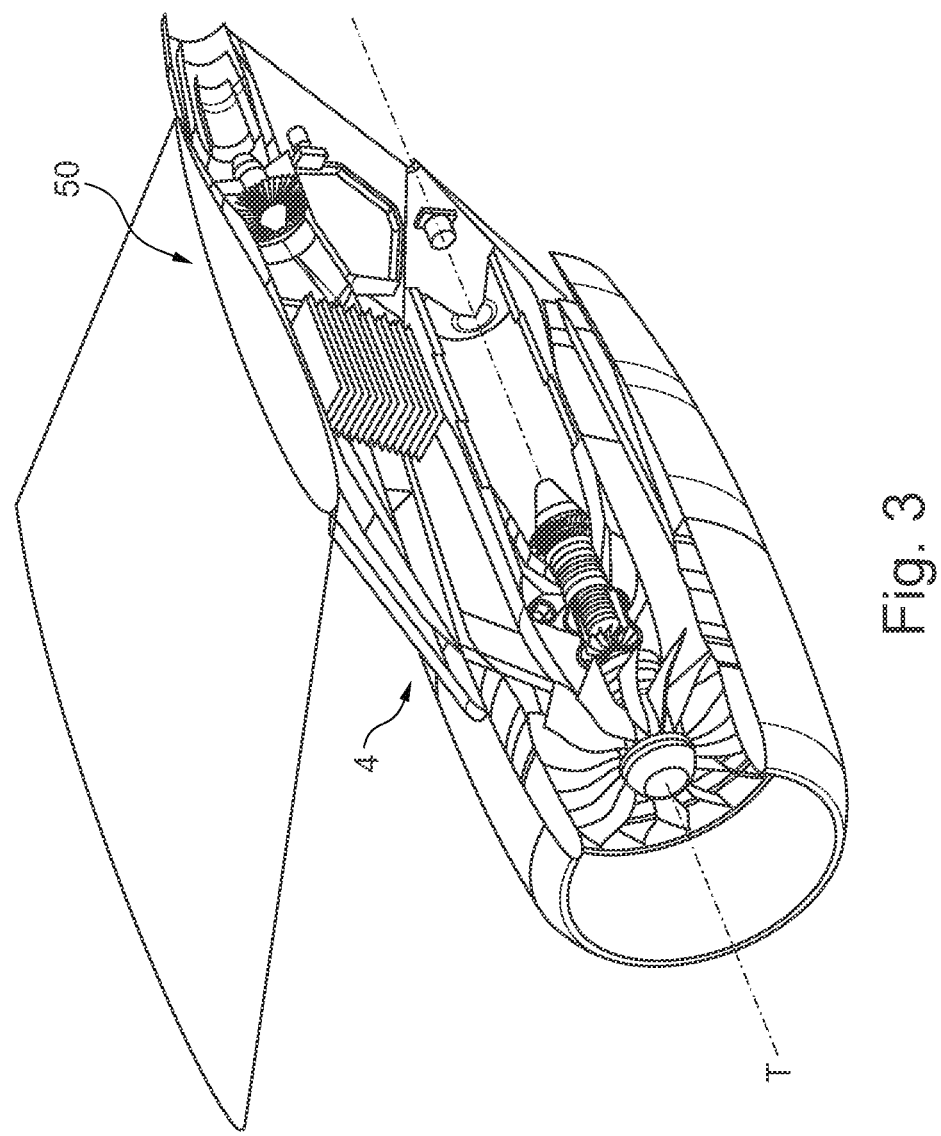
FIG. 3 shows a perspective partial section of the aircraft.
Figure 4:
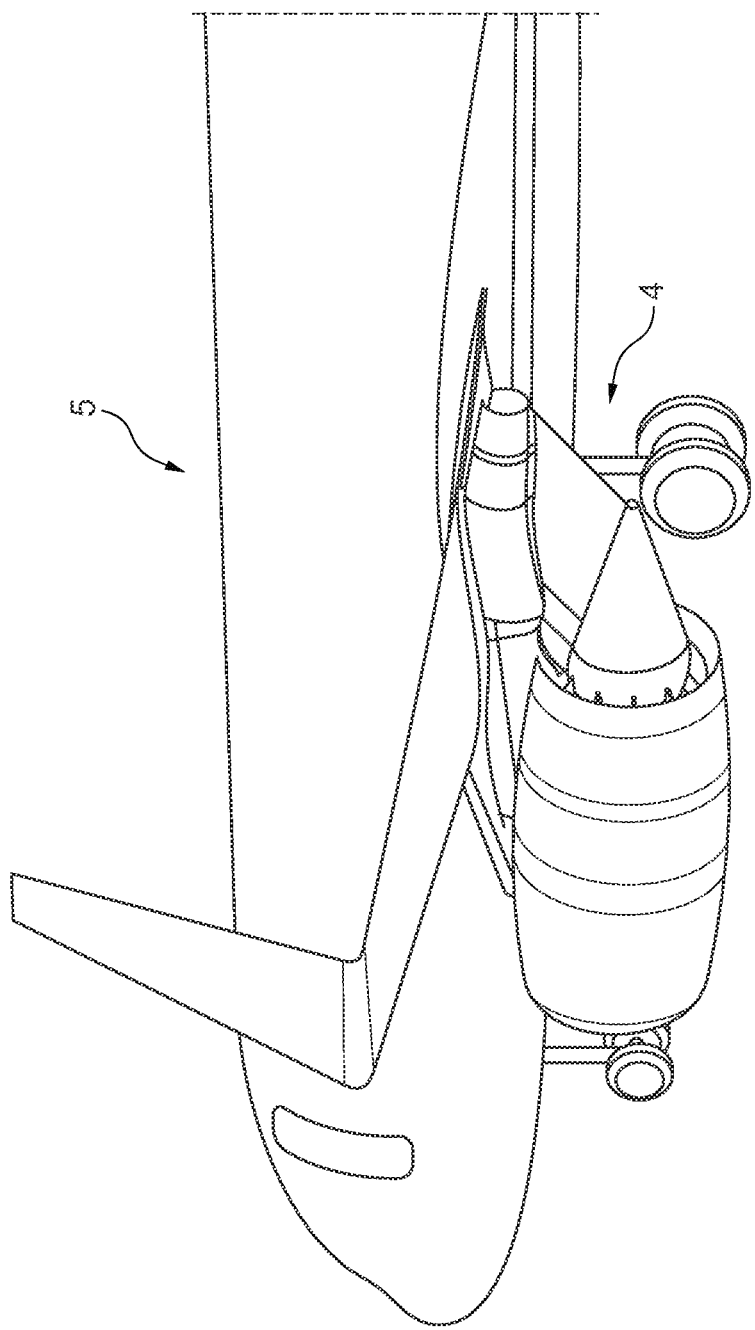
FIG. 4 shows a perspective partial section of the aircraft.

FIGS. 3, 4 show in a perspective partial oblique section slanting from upper front and a perspective partial oblique section slanting from bottom rear an aircraft 5 according to one embodiment of the present invention, FIGS. 1, 2 show a portion of this aircraft in a longitudinal section (FIG. 1) and a section perpendicular to this (FIG. 2).

The aircraft 5 has multiple identically constructed propulsion systems 1, each having a flight propulsion drive in the form of a turbofan engine, being mounted respectively on an (individual) engine pylon 4. The construction and mode of operation of the propulsion systems 1 and their arrangement on the respective wing are at least substantially identical, so that in the following only one of these propulsion systems will be described with reference to FIGS. 1, 2.

The propulsion system or each of the propulsion systems comprises in succession for its flight propulsion drive a connected steam generator 30, a condenser (heat exchanger) 32, and a water recovery device having a water removal channel 200. The exhaust gas of a gas turbine of the turbofan engine flows through the downstream situated steam generator 30, where energy is removed from it for the generating of superheated steam, which is supplied to the process once again. After this, it flows through the condenser heat exchanger 32. This condenser has ambient air flowing through it on the cold side. After this, the exhaust gas arrives at the water recovery device, where water of condensation is removed from the remaining exhaust gas flow. The water can be treated and supplied by condensate or feed water pump(s) 49a, 49b to the steam generator. This closes the water circulation circuit. The steam is mixed in with the compressed air in the area of a combustion chamber 16 of the gas turbine.

Thanks to the use of the exhaust gas energy and the reduced power demand inside the engine itself, a very effective circulatory process occurs with very high specific power in terms of the mass flow rate.

The propulsion system is connected respectively by a pylon 4 to a wing 50. The turbomachine portion 2 is mounted on the pylon 4. The figure shows a front suspension 21 on a fan housing and a rear suspension 20 on a turbine exit casing 19. The thrust is transmitted via a thrust guide 22 from the inlet housing 12 to the pylon and then to the wing.

The turbomachine portion 2 in the exemplary embodiment is a 3-shaft machine. A fan 10, which is driven via a gearing 11 by a low-pressure turbine 18, forms the first shaft, together with the low-pressure turbine. Optionally, a low-pressure compressor (not shown) could also be arranged on this shaft.

The second shaft is arranged concentric to the first. Its principal component is a compressor 13, driven by a high-pressure turbine 17.

By contrast with a conventional engine, a third shaft is present, being situated not coaxially with, but instead next to the core engine. The principal components of this shaft are a further compressor 14, driven by a steam turbine 15.

The process employed here with steam supply through a steam supply device 110 produces a very high specific power and thus a low air flow rate for the compressor.

In a coaxial arrangement, very small radial blade dimensions and accordingly large gap losses would occur, especially in the end region of the gasket. Especially for this reason, the placement of the last compressor 14 next to the core engine is advantageous and furthermore easy to realize, since no mechanical propulsion is needed from one of the other two shafts, since the propulsion comes from the steam turbine 15.

The air delivered by the fan 10 is further compressed in the compressors 13, 14. After this, the compressed air is mixed with the waste steam of the steam turbine 15 and supplied for the most part to the combustion chamber 16. A portion is also used for cooling of the combustion chamber and the turbine, especially the high-pressure turbine 17. In the combustion chamber 16, heat is supplied to the working medium by the burning of fuel. In the turbines 17, 18, energy is extracted from the working gas. The obtained power is primarily handed over to the compressor 13 and the fan 10.

The steam generator 30 is situated downstream from the turbomachine portion or the aircraft engine 2. It comprises a feed water preheating section, an evaporation section (between the feed water preheating and the superheating section) and a superheating section. Each of the three ring-shaped heat exchanger modules shown in FIG. 1 comprises a preheating, evaporation and superheating section. Alternatively, one of the heat exchanger modules can also form a feed water preheating section, another one of the heat exchanger modules can also form an evaporation section, and another one of the heat exchanger modules can also form a superheating section.

The steam generator is designed as a tube-bundle heat exchanger in crossflow/counter-flow arrangement with multiple passages. It is accommodated with rotational symmetry and concentrically to the engine axis or axis of rotation T of the flight propulsion drive within the core engine cladding 35. In particular, for better adapting to the shape of the core engine cladding, the steam generator 30 can be composed of multiple modules having different diameters. It is likewise fastened on the pylon 4 with the suspension(s) 38.

Between the turbomachine portion or the aircraft engine 2 and the steam generator or heat exchanger 30 there is arranged a gasket 23, allowing a certain relative movement of these units relative to each other.

Thanks to this arrangement, the individual units can be handled independently of each other. Thus, in particular, the steam generator can remain on the aircraft when the turbomachine portion is removed from the wing for maintenance purposes, and vice versa.

After the exhaust gas has flowed radially through the steam generator 30, it is guided through ribs 31, which are arranged in the bypass duct 37, to the condenser 32, composed of multiple modules. The condenser modules in the exemplary embodiment are configured as plate heat exchangers in crossflow arrangement and are placed concentric with the engine axis T in the bypass duct 37, the so-called C-ducts. The exterior housing or claddings 3 of the C-ducts are swivel-mounted on the pylon 4 by hinged links 49.

On the left side, FIG. 2 illustrates schematically the flow in the C-duct in this region. On the right side, only the outline of the C-duct is shown with its cladding folded open.

In particular, it can be seen from FIG. 1 that the condenser modules 32 are arranged in the bypass duct 27 such that only a portion of the air delivered by the fan 10 flows through the condenser on the cold side. The other portion flows past it. Both streams are then brought together again and expanded to ambient pressure in the bypass nozzle 36. In one further development, which is not shown, the entire air from the bypass duct 37 is conducted through the condenser 32.

As the exhaust gas flows through, heat is transferred from it to the air, so that its temperature rises. The higher temperature produces a greater enthalpy gradient for the expansion in the bypass nozzle 36. As a result, the heat of evaporation being removed is not entirely lost, but instead contributes to boosting the thrust. The exhaust gas is cooled down so much that the water contained in it is at least partially condensed and exists in liquid form. After this, the exhaust gas is guided by the ribs 33 into a collection duct 34 running along the inner C-duct surface. From the collection duct 34, the exhaust gas flows through the opening 41 in the pylon structural part 40.

Downstream from the pylon opening 41, separation plates 42 are provided inside the pylon structural piece 40 or water removal channel 200. The separation plates are two-dimensional components which are arranged in the flow direction. Grooves or channels are provided at the plate ends, which catch and drain the liquid water building up on the surface. Further downstream, the exhaust gas flows through an optional last turbine stage 43, by which its temperature is lowered even further, so that even more water condenses. A further advantage of this arrangement is that the design size and the pressure losses of the heat exchangers 30, 32 situated downstream can be reduced. The power of the turbine 43 is fed to a generator 44. The turbine 43 can be designed such that the exiting exhaust gas experiences a twisting. In this way, water droplets are moved radially outward. The water droplets then deposit onto the inner surface of the duct and on the surface of separation pipes 45.

The duct and the separation pipes, like the separation plates 42, are provided with grooves or channels for catching and draining the water. In one further development without the last turbine stage 43, the centrifuging of the water droplets can be supported by a swirl generator (not shown).

For better separating action, the separation plates 42, the inner surface of the pylon structure 40 and/or the separation pipes 45 can be composed of water-attracting or hydrophilic materials or can be coated with such materials. These components can also serve as a precipitation electrode for the electrostatically supported water separation or be adapted as heat exchangers of a cooling circuit. In this case, the outer surface of the pylon and/or the nacelle can be designed as a condenser of the cooling system.

The separated water is taken by the condensate pump 49a through an optionally present water treatment to a water storage tank 48. From here, the water is supplied by means of the feed water pump 49b to the steam generator 30.

The water storage tank can be arranged on the aircraft side. Auxiliary devices for the steam generation, cooling, water treatment and water storage, such as condensate pump, feed water pump, filter, water tank, cooling compressor or the like, are not shown in detail in the figures, but can be placed directly on the flight propulsion drive. The space inside the pylon cladding 47 and/or inside the exit cone 39 can be used advantageously for this purpose.

The propulsion system with flight propulsion drive, heat exchanger and water removal channel can have a significantly greater weight when compared to a conventional system. This greater weight can advantageously act against the wing lift, thanks to its mounting on the retainer 4, and in this way, it can reduce the bending moment at the wing root. Because of the high specific power of the propulsion drivetrain, the turbomachine portion can be made lighter and/or more compact than a conventional drivetrain, so that the center of gravity can be closer to the wing. Furthermore, one or more of the (additional) components can be arranged underneath and/or partly behind the wing torsion midpoint and the torsion moment can be reduced thereby. In this way, the wing's structural weight can be decreased and the extra weight can be at least partly compensated.

Figure 5:
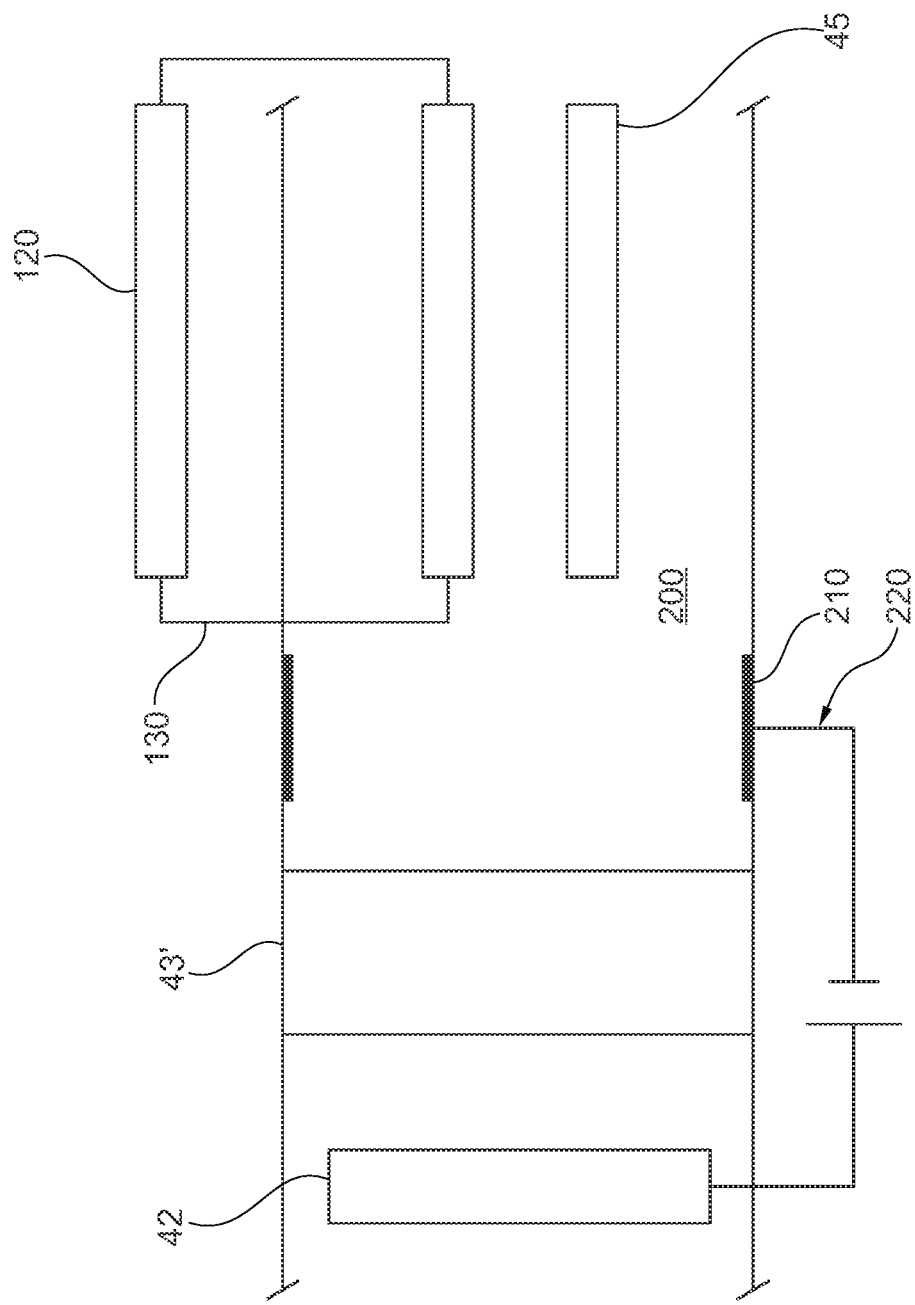
FIG. 5 shows a section through a water removal channel of an aircraft according to another embodiment of the present invention.

FIG. 5 shows a section through a water removal channel 200 of an aircraft according to a further embodiment of the present invention, which agrees with the previously explained embodiment except for the differences explained below, so that reference is made to the preceding description and only differences will be explained in the following.

In the embodiment of FIG. 5, the turbine stage 43 is replaced by a swirl generator 43'.

Furthermore, the separation plates 42 and a portion of the inner surface of the water removal channel 200, configured as a precipitation electrode 210 for the electrostatically supported water separation, are set up as parts of an electrostatic removal apparatus 220.

Moreover, the separation pipes 45 are set up as a heat exchanger of a cooling circuit 130 with a condenser 120.

Although exemplary embodiments have been explained in the preceding description, it should be noted that many further developments are possible.

Thus, for example, one or more of the elements 42, 43, 43', 44, 45, 130 and/or 220 can be omitted or combined in a different way than that of FIGS. 1, 5. Furthermore, the electrostatic removal apparatus 220 can be outfitted with different electrodes and/or the cooling circuit 130 can be set up with a different heat exchanger.

Moreover, it should be pointed out that the exemplary embodiments are merely examples which in no way restrict the scope of protection, the applications, or the layout. Instead, the preceding description is meant to provide the person skilled in the art with a guidance for implementing at least one exemplary embodiment, although various changes can be made, especially in terms of the function and arrangement of the described components, without leaving the scope of protection as results from the claims and combinations of features equivalent to them.

What is claimed is:

1. An aircraft comprising:
    a wing, a flight propulsion drive, and an engine pylon retainer, which joins together the wing and the flight propulsion drive,
    at least one heat exchanger for cooling the exhaust gas of the fight propulsion drive and/or at least one water removal channel with at least one removal apparatus for separating water from the exhaust gas of the flight propulsion drive, after flowing through the heat exchanger,
    a condenser for respectively cooling down exhaust gas of the flight propulsion drive, situated between the heat exchanger and the water removal channel in a bypass duct of the flight propulsion drive, comprising one or more condenser sections arranged concentrically to an axis of rotation of the flight propulsion drive and/or designed as plate and/or crossflow and/or counter-flow heat exchangers, and/or by at least one collection duct enclosing the condenser, for collecting exhaust gas cooled down by the condenser,
    wherein the removal apparatus is arranged on, in, the retainer or is connected by the retainer to the wing and/or the flight propulsion drive is fastened on the retainer by at least one flight propulsion drive suspension and the heat exchanger is fastened, independently of the flight propulsion drive suspension, on the retainer by at least one heat exchanger suspension.

2. The aircraft according to claim 1, further comprising a steam supply device connected to the heat exchanger, for supplying steam to at least one combustion space of the flight propulsion drive and/or by a steam turbine arranged between the heat exchanger and the steam supply device, for driving at least one compressor of the flight propulsion drive.

3. The aircraft according to claim 1, wherein an axis of rotation of the steam turbine and/or of the compressor is spaced apart from an axis of rotation of the flight propulsion drive.

4. The aircraft according to claim 1, further comprising at least one gasket between the flight propulsion drive and the heat exchanger.

5. The aircraft according to claim 1, wherein the heat exchanger comprises one or more heat exchanger sections arranged concentrically to an axis of rotation of the flight propulsion drive and/or configured and arranged as tube-bundle and/or crossflow and/or counter-flow heat exchangers configured as heat exchanger modules and/or having different diameters.

6. The aircraft according to claim 1, wherein the removal apparatus comprises at least one separation plate arranged in the water removal channel and/or at least one swirl generator arranged in the water removal channel downstream from the separation plate, and/or at least one turbine stage arranged in the water removal channel downstream from the separation plate coupled to a generator, and/or at least one separation pipe arranged in the water removal channel downstream from the turbine stage and/or the swirl generator, and/or at least one electrostatic removal apparatus, and/or at least one heat exchanger with coolant flowing through it in a cooling circuit and/or has an at least partial hydrophilic surface.

7. The aircraft according to claim 1, further comprising at least one pump for delivery of water coming from the water removal channel and/or at least one water tank for storing of water from the water removal channel.

8. The aircraft according to claim 1, further comprising at least one exhaust gas passage for guiding of exhaust gas of the flight propulsion drive from the heat exchanger and/or to the water removal channel, comprising at least one opening in a structural part of the retainer.

9. The aircraft according to claim 1, wherein the flight propulsion drive comprises at least one thermal engine, configured as a gas turbine, and/or at least one encased propeller and/or a propeller coupled by a gearing to the thermal engine.

10. A method for operating an aircraft according to claim 1, wherein the heat exchanger cools down exhaust gas of the flight propulsion drive, at least temporarily, and/or the removal apparatus separates water from the exhaust gas of the flight propulsion drive.

11. A method for assembling and/or servicing an aircraft according to claim 1, wherein the removal apparatus is arranged in the retainer or is connected by the retainer to the wing, and/or the flight propulsion drive is fastened on the retainer by the flight propulsion drive suspension, and the heat exchanger is fastened on the retainer by the at least one heat exchanger suspension.

* * * * *